US011152621B2

United States Patent
Kim et al.

(10) Patent No.: US 11,152,621 B2
(45) Date of Patent: Oct. 19, 2021

(54) NEGATIVE ELECTRODE ACTIVE MATERIAL AND METHOD OF PREPARING THE SAME

(71) Applicant: LG Chem, Ltd., Seoul (KR)

(72) Inventors: Hyun Wook Kim, Daejeon (KR); Eun Kyung Kim, Daejeon (KR); Sun Young Shin, Daejeon (KR)

(73) Assignee: LG Chem, Ltd.

( * ) Notice: Subject to any disclaimer, the term of this patent is extended or adjusted under 35 U.S.C. 154(b) by 36 days.

(21) Appl. No.: 15/558,631

(22) PCT Filed: Apr. 15, 2016

(86) PCT No.: PCT/KR2016/003926
§ 371 (c)(1),
(2) Date: Sep. 15, 2017

(87) PCT Pub. No.: WO2016/167591
PCT Pub. Date: Oct. 20, 2016

(65) Prior Publication Data
US 2018/0090761 A1 Mar. 29, 2018

(30) Foreign Application Priority Data

Apr. 15, 2015 (KR) .................. 10-2015-0053330
Apr. 14, 2016 (KR) .................. 10-2016-0045345

(51) Int. Cl.
*H01M 4/133* (2010.01)
*H01M 4/587* (2010.01)
(Continued)

(52) U.S. Cl.
CPC ............. *H01M 4/587* (2013.01); *C01B 32/21* (2017.08); *C01B 32/23* (2017.08); *H01M 4/625* (2013.01);
(Continued)

(58) Field of Classification Search
CPC ...... H01M 4/578; H01M 4/625; H01M 4/622; H01M 4/661; H01M 4/133;
(Continued)

(56) References Cited

U.S. PATENT DOCUMENTS

2004/0160156 A1\* 8/2004 Ohata .................... B82Y 30/00
313/346 R
2005/0074672 A1\* 4/2005 Matsubara .......... H01M 4/0421
429/231.95
(Continued)

FOREIGN PATENT DOCUMENTS

| CN | 102034975 A | 4/2011 |
|---|---|---|
| EP | 1936518 A1 | 6/2008 |
| KR | 101006121 B1 | 1/2011 |

OTHER PUBLICATIONS

Lu et al., Anodic performance of vapor derived carbon filaments in lithium ion secondary battery (Year: 2000).*
(Continued)

*Primary Examiner* — Uyen M Tran
(74) *Attorney, Agent, or Firm* — Lerner, David, Littenberg, Krumholz & Mentlik, LLP

(57) ABSTRACT

Since a surface of the artificial graphite of the negative electrode active material according to the present invention is modified with nitrogen, dispersibility in an aqueous system may be improved and accordingly, affinity between a binder and the negative electrode active material is increased to increase the adhesive strength of an electrode. Also, since the surface of the artificial graphite is modified with nitrogen, there is an effect of maintaining a high battery capacity. Furthermore, in the method of preparing a negative electrode active material according to the present invention, since an oxygen-containing functional group is connected to the artificial graphite by a mild oxidation process, the nitrogen may be easily attached to the artificial graphite so that the
(Continued)

negative electrode active material becomes an electrical conductor by maintaining original crystallinity while having a hydrophilic property. Thus, excellent battery efficiency may be achieved.

17 Claims, 5 Drawing Sheets

(51) Int. Cl.
*C01B 32/23* (2017.01)
*C01B 32/21* (2017.01)
*H01M 4/62* (2006.01)
*H01M 4/66* (2006.01)
*H01M 4/02* (2006.01)

(52) U.S. Cl.
CPC ......... *H01M 4/661* (2013.01); *C01P 2002/54* (2013.01); *C01P 2004/61* (2013.01); *C01P 2006/40* (2013.01); *H01M 4/133* (2013.01); *H01M 4/622* (2013.01); *H01M 2004/027* (2013.01)

(58) Field of Classification Search
CPC .............. H01M 2004/027; C01B 32/21; C01P 2004/61; C01P 2002/54; C01P 2006/40
See application file for complete search history.

(56) References Cited

U.S. PATENT DOCUMENTS

| | | | | |
|---|---|---|---|---|
| 2009/0140214 A1* | 6/2009 | Sonobe | ................ | H01M 4/587 252/511 |
| 2009/0297945 A1* | 12/2009 | Hwang | ................ | H01M 4/42 429/207 |
| 2011/0315934 A1* | 12/2011 | Ma | ................ | H01B 1/24 252/511 |
| 2012/0034522 A1* | 2/2012 | Sheem | ................ | H01M 4/13 429/213 |
| 2012/0149897 A1* | 6/2012 | Jeon | ................ | C07D 471/22 540/477 |
| 2013/0143127 A1* | 6/2013 | Nakamura | ................ | H01M 4/587 429/231.8 |

OTHER PUBLICATIONS

Search report from International Application No. PCT/KR2016/003926, dated Jul. 4, 2016.
Wu, Y. P., et al., "Anode Materials for Lithium Ion Batteries Obtained by Mild and Uniformly Controlled Oxidation of Natural Graphite." Journal of Solid State Electrochemistry, vol. 8, 2003, pp. 73-28.
Zheng, Fangcai, et al., "High lithium anodic perforamnce of highly nitrogen-doped porous carbon prepared from a metal-organic framework." Nature Communications, 2014, vol. 5, pp. 1-10.
Long, Donghui et al., "Preparation of Nitrogen-Doped Graphene Sheets by a Combined Chemical and Hydrothermal Reduction of Graphene Oxide." Langmuir, 2010. Vo. 26, No. 20, pp. 16096-16102.
Chen, Taiqiang, et al., "Porous nitrogen-doped carbon microspheres as anode materials for lithium ion batteries " Dalton Transactions, The Royal Society of Chemistry, 2014, vol. 43, pp. 14931-14395.

* cited by examiner

NEGATIVE ELECTRODE ACTIVE MATERIAL AND METHOD OF PREPARING THE SAME

CROSS-REFERENCE TO RELATED APPLICATION

The application is a national phase entry under 35 U.S.C. § 371 of International Application No. PCT/KR2016/003926, filed Aug. 15, 2016, which claims priority to Korean Patent Application No. 10-2015-0053330, filed on Apr. 15, 2015, and Korean Patent Application No. 10-2016-0045345, filed on Apr. 14, 2016, the disclosures of which are incorporated herein in its entirety by reference.

TECHNICAL FIELD

The present invention relates to a negative electrode active material and a method of preparing the same.

BACKGROUND ART

Requirements for the use of alternative energy or clean energy have increased due to the rapid increase in the use of fossil fuels, and, as a part of this trend, power generation and electricity storage using an electrochemical reaction are the most actively researched areas.

Currently, a typical example of an electrochemical device using the electrochemical energy may be a secondary battery and there is a trend that its usage area is expanding more and more. In recent years, demand for secondary batteries as an energy source has been significantly increased as technology development and demand with respect to portable devices, such as portable computers, mobile phones, and cameras, have increased. Among these secondary batteries, lithium secondary batteries having high energy density, high operating potential, long cycle life, and low self-discharging rate have been subjected to considerable research and have been commercialized and widely used.

Also, in line with growing concerns about environmental issues, a significant amount of research into electric vehicles and hybrid electric vehicles, which may replace vehicles using fossil fuels, such as gasoline vehicle and diesel vehicle, one of major causes of air pollution, has been conducted. Nickel-metal hydride secondary batteries have been mainly used as power sources of the electric vehicles and hybrid electric vehicles. Especially, research into the use of lithium secondary batteries having high energy density and discharge voltage has been actively conducted and some of the research are in a commercialization stage.

A typical lithium secondary battery uses graphite as a negative electrode active material, and charge and discharge of the lithium secondary battery is performed while a process of intercalating and deintercalating lithium ions from a positive electrode into and out of a negative electrode is repeated. Although there is a difference in theoretical capacity of the battery according to the type of electrode active materials, charge and discharge capacities may be generally reduced as cycles proceed.

The biggest cause of this phenomenon is that the active material does not fully function because separation between electrode active material particles or separation between the electrode active material and a current collector occurs due to changes in the volume of the electrode occurred during the charge and discharge of the battery.

As a prior art related to an aqueous binder and a negative electrode active material, a negative electrode for a non-aqueous secondary battery, a non-aqueous secondary battery, a method of preparing a negative electrode for a non-aqueous secondary battery, and electronic devices using the non-aqueous secondary battery have been proposed. Specifically, provided is a negative electrode for a non-aqueous secondary battery including graphite, carbon black, and an aqueous binder, wherein the carbon black includes particles having an aspect ratio of 1.0 or more to 5.0 or less and a maximum diameter of 0.05 μm or more to 10 μm or less, and the negative electrode has an electrode density of 1.50 g/cm$^3$ to 1.80 g/cm$^3$, and, in this case, the prior art discloses that artificial graphite may be used as the graphite.

However, according to the above method, since the artificial graphite, which has a hydrophobic property due to the preparation by a high-temperature heat treatment, is used, dispersibility in an aqueous system may be poor, and thus, adhesion between the active material and the electrode may be poor.

Therefore, there is a need to develop an electrode material which may promote the structural stability of an electrode and the resulting improvement in the performance of a battery by preventing the separation between the electrode active material particles or between the electrode active material and the current collector during the preparation of the electrode.

PRIOR ART DOCUMENT

Korean Patent No. 10-1006121

DISCLOSURE OF THE INVENTION

Technical Problem

An aspect of the present invention provides a negative electrode active material which may improve dispersibility in an aqueous system by modifying the surface of artificial graphite to be hydrophilic.

Another aspect of the present invention provides a method of preparing the negative electrode active material.

Another aspect of the present invention provides a negative electrode for a secondary battery including the negative electrode active material.

Another aspect of the present invention provides a secondary battery including the negative electrode, and a battery module and a battery pack which include the secondary battery.

Technical Solution

According to an aspect of the present invention, there is provided a negative electrode active material including artificial graphite surface-modified with nitrogen atoms, wherein the nitrogen atoms are included in an amount of 5 wt % to 10 wt % based on a total weight of all atoms present in an outermost layer of the negative electrode active material including artificial graphite.

According to another aspect of the present invention, there is provided a method of preparing the negative electrode active material of the present invention including the steps of:

connecting an oxygen-containing functional group to artificial graphite by a mild oxidation process (step 1); and doping with nitrogen by reducing the oxygen-containing functional group connected artificial graphite of step 1 in a nitrogen atmosphere (step 2).

According to another aspect of the present invention, there is provided a negative electrode for a secondary battery in which a negative electrode collector is coated with a negative electrode active material slurry including the negative electrode active material.

According to another aspect of the present invention, there is provided a secondary battery including the negative electrode, a positive electrode, and a non-aqueous electrolyte solution, and a battery module and a battery pack which include the secondary battery.

Advantageous Effects

According to the present invention, since a negative electrode active material formed of artificial graphite, which is surface-modified with a specific amount of a nitrogen element, is included, dispersibility in an aqueous system is improved and affinity with a binder is increased to increase adhesive strength, and accordingly, a negative electrode for a secondary battery, which may have an effect of maintaining a high battery capacity, and a secondary battery including the negative electrode may be prepared.

Furthermore, since the negative electrode active material according to the present invention maintains original crystallinity while having a hydrophilic property by connecting an oxygen-containing functional group to the surface of the artificial graphite in an amount of about 10 wt % to 20 wt % by a preparation method using a mild oxidation process, the negative electrode active material becomes an electrical conductor, and thus, excellent battery efficiency may be achieved.

MODE FOR CARRYING OUT THE INVENTION

Figure 1:
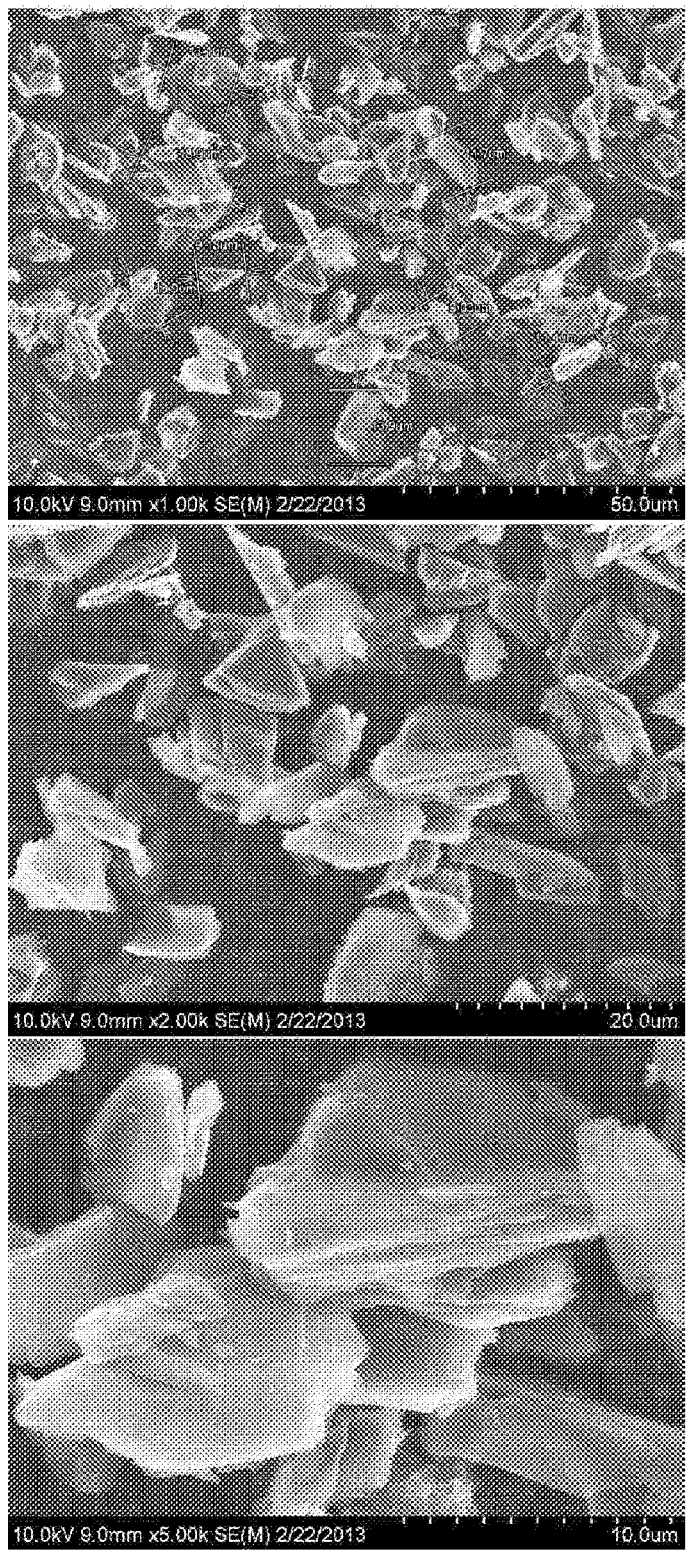
FIG. 1 is scanning electron microscope (SEM) images of nitrogen-doped artificial graphite prepared in step 2 of Example 1.

Hereinafter, the present invention will be described in more detail to allow for a clearer understanding of the present invention.

It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

The terminology used herein is for the purpose of describing particular example embodiments only and is not intended to be limiting of the present invention. In the specification, the terms of a singular form may include plural forms unless referred to the contrary.

It will be further understood that the terms "include," "comprise," or "have" when used in this specification, specify the presence of stated features, numbers, steps, elements, or combinations thereof, but do not preclude the presence or addition of one or more other features, numbers, steps, elements, or combinations thereof.

Since artificial graphite is prepared by a high-temperature heat treatment, all of oxygen-containing functional groups present on a surface of the artificial graphite are removed, an thus, the artificial graphite has a hydrophobic property. However, the hydrophobic artificial graphite may have various limitations, such as changes in viscosity and aging, in an aqueous system.

Thus, in the present invention, the surface of the artificial graphite is modified to be hydrophilic so as to exhibit excellent dispersibility in the aqueous system, and thus, the present invention aims at providing a more stable electrode.

First, according to an embodiment of the present invention, provided is a negative electrode active material including artificial graphite surface-modified with nitrogen atoms, wherein the nitrogen atoms are included in an amount of 5 wt % to 10 wt % based on a total weight of all atoms present in the outermost layer of the negative electrode active material including artificial graphite.

Flaky artificial graphite having a diameter of 5 μm to 20 μm may be used as the negative electrode active material according to the present invention. As the artificial graphite, at least one selected from the group consisting of graphitized mesocarbon microbeads, graphitized mesophase pitch-based carbon fibers, and graphitized cokes may be used, but the artificial graphite is not limited thereto.

Since the artificial graphite is prepared by a high-temperature heat treatment, all of oxygen-containing functional groups present on a surface of the artificial graphite are removed, an thus, the artificial graphite has a hydrophobic property. As a result, the hydrophobic artificial graphite may have various limitations, such as changes in viscosity and aging, in an aqueous system.

In the present invention, in order to address the limitations of the artificial graphite having the hydrophobic surface, a negative electrode active material is provided in which the surface of the artificial graphite is modified with nitrogen.

In this case, an amount of the nitrogen may be in a range of 5 wt % to 10 wt % based on a weight of all atoms present in the outermost layer of the negative electrode active material including artificial graphite. In this case, a degree (%) of modification with the nitrogen may be quantitatively analyzed by X-ray photoelectron spectroscopy (XPS). Also, a range of the outermost layer of the negative electrode active material denotes a thickness range of 100 nm or less in a core direction from the surface of the negative electrode active material, i.e., the negative electrode active material surface located farthest from the center.

In a case in which the amount of the doped nitrogen is less than 5 wt %, hydrophilicity may be insufficient, aqueous dispersibility may not be improved, and a large amount of the oxygen-containing functional group may be exposed so that the negative electrode active material may be electrochemically unstable. In a case in which the amount of the doped nitrogen is greater than 10 wt %, since side reactivity with an electrolyte solution is increased, initial efficiency and lifetime characteristics of a battery may be reduced.

Since the surface of the artificial graphite has a high energy barrier, it is difficult to directly modify the surface with nitrogen. Thus, in order to partially modify the surface of the artificial graphite with nitrogen, a method may be used in which an oxygen-containing functional group is first connected to the surface of the artificial graphite to reduce the energy barrier, and the modification with the nitrogen is then performed by using the oxygen-containing functional group.

That is, the surface of the artificial graphite is composed of —CH$_2$ or CH$_3$, wherein since, among them, a site, from which at least one hydrogen atom is detached, is substituted with the oxygen-containing functional group, the oxygen-containing functional group may be connected to the surface of the artificial graphite. Subsequently, the oxygen-containing functional group connected artificial graphite is doped with nitrogen to substitute the oxygen-containing functional group itself or a portion of the oxygen-containing functional group with the nitrogen, and thus, the surface of the artificial graphite may be finally modified with the nitrogen atoms.

At least one selected from the group consisting of a hydroxyl group, an epoxy group, a carboxyl group, and a lactol group may be used as the oxygen-containing functional group, but the present invention is not limited thereto.

The oxygen-containing functional group may be connected to the surface of the artificial graphite in advance in an amount equivalent to the amount of the doped nitrogen. Specifically, since the amount of the doped nitrogen is in a range of about 5 wt % to about 10 wt % based on the total weight of all atoms present in the outermost layer of the negative electrode active material, the oxygen-containing functional group connected to the surface of the artificial graphite before the modification with nitrogen may be included in an amount of about 10 wt % to about 20 wt % based on covalent bondable sites of the outermost carbon atoms of the artificial graphite. In this case, a degree (substitution ratio) to which the oxygen-containing functional group is connected to the surface of the artificial graphite may be quantitatively measured by an elemental analyzer.

In a case in which the amount of the connected oxygen-containing functional group is less than 10 wt %, since the amount of nitrogen to be connected in a subsequent process is small, the artificial graphite may not properly exhibit hydrophilicity. In a case in which the amount of the connected oxygen-containing functional group is greater than 20 wt %, since excessive oxidation occurs, it is difficult to be entirely reduced in the subsequent process. In addition, since a (002) plane of the artificial graphite expands to separate a graphite layer, capacity is reduced or a structure is not solid, and thus, the artificial graphite may be insufficient for the battery.

The oxygen-containing functional group may be connected to the surface of the artificial graphite by a mild oxidation process, and the process will be described in detail in the following method of preparing a negative electrode active material.

After the modification with nitrogen, the oxygen-containing functional group may be bonded in an amount of about 5 wt % to about 15 wt % based on the covalent bondable sites of the outermost carbon atoms of the artificial graphite in the negative electrode active material.

This denotes an amount of the remaining oxygen-containing functional group which is not substituted with the nitrogen atom, after 25 wt % to 50 wt % of the oxygen-containing functional group itself or a portion of the oxygen-containing functional group among 10 wt % to 20 wt % of the initially connected oxygen-containing functional group is substituted with the nitrogen atoms.

Specifically, according to an embodiment of the present invention, provided is a negative electrode active material including artificial graphite surface-modified with a nitrogen atom, wherein the artificial graphite is bonded with 5 wt % to 10 wt % of nitrogen atom or an oxygen-containing functional group having a portion substituted with the nitrogen atom; 5 wt % to 15 wt % of the oxygen-containing functional group; and 80 wt % to 90 wt % of a hydrogen atom, based on a total weight of covalent bondable sites of outermost carbon atoms of the artificial graphite.

As described above, since the surface of the artificial graphite used as the negative electrode active material in the present invention has a high energy barrier, it is difficult to directly modify the surface with nitrogen. Thus, in order to modify the surface of the artificial graphite to be hydrophilic, a portion of the surface of the artificial graphite is substituted with the oxygen-containing functional group to reduce the energy barrier, and the nitrogen atoms are then connected by using the oxygen-containing functional group.

Specifically, the surface of the artificial graphite is composed of —CH$_2$ or CH$_3$, wherein since, among them, a site, from which at least one hydrogen atom is detached, is substituted with the oxygen-containing functional group, the oxygen-containing functional group may be connected to the surface of the artificial graphite. The oxygen-containing functional group connected artificial graphite is doped with nitrogen to substitute the oxygen-containing functional group itself or a portion of the oxygen-containing functional group with the nitrogen, and thus, the outermost surface of the artificial graphite may be finally modified with the nitrogen atoms.

In this case, an amount of the nitrogen atom or the oxygen-containing functional group having a portion substituted with the nitrogen atom may be in a range of 5 wt % to 10 wt % based on the covalent bondable sites of the outermost carbon atoms of the artificial graphite. With respect to the oxygen-containing functional group having a portion substituted with the nitrogen atom, since the nitrogen atom is eventually present on the outermost layer of the negative electrode active material, the negative electrode active material may have hydrophilicity.

In a case in which the amount of the nitrogen element or the oxygen-containing functional group having a portion substituted with the nitrogen is less than 5 wt %, the hydrophilicity may be insufficient, the aqueous dispersibility may not be improved, and a large amount of the oxygen-containing functional group may be exposed so that the negative electrode active material may be electrochemically unstable. In contrast, in a case in which the amount of the nitrogen element or the oxygen-containing functional group having a portion substituted with the nitrogen is greater than 10 wt %, since the side reactivity with the electrolyte solution is increased, the initial efficiency, capacity and lifetime characteristics of the battery may be reduced.

Also, since the amount of the doped nitrogen is specifically in a range of about 5 wt % to about 10 wt % based on all atoms that are present in the outermost layer of the negative electrode active material, the amount of the connected oxygen-containing functional group may be included in a range of 10 wt % to about 20 wt %, i.e., a level equivalent thereto, and the amount of the remaining oxygen-containing functional group present on the surface of the negative electrode active material, which is not substituted with the nitrogen while 25 wt % to 50 wt % of the oxygen-containing functional group itself or a portion of the oxygen-containing functional group is substituted with the nitrogen among the connected oxygen-containing functional groups, may be in a range of 5 wt % to 15 wt % based on the covalent bondable sites of the outermost carbon atoms of the artificial graphite.

In a case in which less than 5 wt % of the oxygen-containing functional group is present on the surface of the negative electrode active material, since a large amount of the nitrogen atoms is present on the surface of the negative electrode active material, the side reactivity with the electrolyte solution may be increased to reduce the initial efficiency, capacity, and lifetime characteristics of the battery. In a case in which greater than 15 wt % of the oxygen-containing functional group is present on the surface of the negative electrode active material, since it is a case in which the surface is doped with a less amount of the nitrogen atoms, the negative electrode active material may not have hydrophilicity, and crystallinity may be reduced because a plane of the artificial graphite may be separated or an interplanar spacing may be increased due to an excessive amount of the connected oxygen-containing functional group.

As described above, since the surface of the artificial graphite is composed of —$CH_2$ or $CH_3$, hydrogen atoms are present on the outermost layer of the negative electrode active material to which the oxygen-containing functional group or nitrogen is not connected. Thus, in the negative electrode active material of the present invention, the hydrogen atom may be bonded in an amount of 80 wt % to 90 wt % based on the covalent bondable sites of the outermost carbon atoms of the artificial graphite.

In a case in which the hydrogen atom is bonded in an amount of less than 80 wt %, since an excessive amount of the oxygen-containing functional group or nitrogen atom is present on the surface of the negative electrode active material, the side reactivity with the electrolyte solution may be increased to reduce the initial efficiency, capacity, and lifetime characteristics of the battery or electrical properties of the active material may be deteriorated. In a case in which the hydrogen atom is bonded in an amount of greater than 90 wt %, since it is a case in which the surface is doped with a less amount of the nitrogen atom, the negative electrode active material may not have hydrophilicity.

Also, an interplanar spacing ($d_{002}$) of a carbon hexagonal plane of the nitrogen-modified negative electrode active material according to the embodiment of the present invention may be in a range of 0.3350 nm to 0.3400 nm. In the negative electrode active material of the present invention, since the oxygen-containing functional group is connected to only a portion of the surface of the artificial graphite, limitations, in which the crystallinity is reduced because the plane of the artificial graphite is separated or the interplanar spacing is increased due to the excessive amount of the connected oxygen-containing functional group, may be addressed and an effect of exhibiting hydrophilicity while maintaining the original crystallinity of the artificial graphite may be obtained.

Typically, artificial graphite having planes being separated by a strong oxidation process or graphite oxide having reduced crystallinity has electrical insulating properties. However, in a case in which the mild oxidation process is performed as in the present invention, its physical properties may be transformed into electrical conducting properties.

With respect to a battery including a negative electrode active material which includes artificial graphite or graphite oxide having electrical insulating properties and is not subjected to the mild oxidation process, lithium ions move as much as the movement of electrons in order to cause an oxidation/reduction reaction, wherein electrical resistance is large and accordingly, a reaction rate is reduced. Thus, since an excessive amount of a conductive agent must be added for smooth operation of the battery, energy density of the battery may be reduced and the initial efficiency as well as adhesive strength may also be reduced.

Furthermore, in an embodiment of the present invention, a method of preparing a negative electrode active material including the steps of:

connecting an oxygen-containing functional group to artificial graphite by a mild oxidation process (step 1); and doping with nitrogen by reducing the oxygen-containing functional group connected artificial graphite of step 1 in a nitrogen atmosphere (step 2).

Hereinafter, the method of preparing a negative electrode active material according to the present invention will be described in detail for each step.

In the method of preparing a negative electrode active material according to the present invention, step 1 is a step of connecting an oxygen-containing functional group to the surface of artificial graphite by a mild oxidation process before nitrogen doping of the artificial graphite is performed.

At least one selected from the group consisting of graphitized mesocarbon microbeads, graphitized mesophase pitch-based carbon fibers, and graphitized cokes may be used as the artificial graphite of step 1, but the artificial graphite is not limited thereto. Since the surface of the artificial graphite has a high energy barrier, it is difficult to directly dope the surface with nitrogen. Thus, the oxygen-containing functional group is first connected to the surface of the artificial graphite to reduce the energy barrier, and the nitrogen doping may then be performed.

In this case, the expression "mild oxidation" of step 1 denotes the connection of the oxygen-containing functional group to covalent bondable sites of outermost carbon atoms of the artificial graphite at a substitution ratio of 10 wt % to 20 wt %. That is, since the surface of the artificial graphite is composed of —$CH_2$ or $CH_3$ and, among them, the oxygen-containing functional group is connected to a site from which at least one hydrogen atom is detached, the surface of the artificial graphite may be oxidized.

In a case in which the oxygen-containing functional group of step 1 is connected to the covalent bondable sites of the outermost carbon atoms of the artificial graphite at a substitution ratio of less than 10 wt %, since the amount of nitrogen to be connected in a subsequent process is small, the artificial graphite may not properly exhibit hydrophilicity. In a case in which the oxygen-containing functional group of step 1 is connected to the covalent bondable sites of the outermost carbon atoms of the artificial graphite at a substitution ratio of greater than 20 wt %, since excessive oxidation occurs, it is difficult to be entirely reduced in the subsequent process. In addition, since the (002) plane of the artificial graphite expands to separate a graphite layer, capacity is reduced or a structure is not solid, and thus, the artificial graphite may be insufficient for the battery.

In this case, the substitution ratio indicating a degree to which the oxygen-containing functional group is connected to the surface of the artificial graphite may be quantitatively measured by an elemental analyzer.

The mild oxidation process of step 1 may be performed by heat treating the artificial graphite at a temperature of 500° C. to 600° C. in an air atmosphere for 1 hour to 1.5 hours or by immersing the artificial graphite in an acid solution for 4 hours to 6 hours and then drying the artificial graphite.

In this case, the acid solution is a nitric acid solution having a concentration of 30 wt % to 50 wt % and a temperature of 50° C. to 70° C., and the drying may be performed in a vacuum state at a temperature of 250° C. to 300° C.

The amount of the oxygen-containing functional group may be adjusted by the limited heat treatment time or immersion time in the acid solution. That is, in the method of the present invention, the amount of the oxygen-containing functional group may be adjusted in a range of 10 wt % to 20 wt % only when the artificial graphite is heat-treated or immersed under the above-described time condition.

In a case in which the heat treatment time or the immersion time in the acid solution is less than the above-described time, the amount of the oxygen-containing functional group is decreased, and accordingly, aqueous dispersibility may not be improved due to a decrease in the amount of the nitrogen element. In a case in which the heat treatment time or the immersion time in the acid solution is greater than the above-described time, the amount of the oxygen-containing functional group is increased, and accordingly, since the amount of the nitrogen element is increased, the side reactivity with the electrolyte solution may be increased to reduce the initial efficiency, capacity and lifetime characteristics of the battery.

The oxygen-containing functional group of step 1 may include at least one selected from the group consisting of a hydroxyl group, an epoxy group, a carboxyl group, and a lactol group, but the oxygen-containing functional group is not limited thereto.

Also, in the method of preparing a negative electrode active material according to the present invention, step 2 is a step of doping with nitrogen by reducing the oxygen-containing functional group connected artificial graphite of step 1 in a nitrogen atmosphere.

Step 2 is a step of substituting the oxygen-containing functional group itself connected to the artificial graphite or a portion of the oxygen-containing functional group with the nitrogen element. Although the artificial graphite may exhibit hydrophilicity even if the oxygen-containing functional group is only attached to the surface of the artificial graphite, electrochemical properties required in a secondary battery may not be satisfied only with the oxygen-containing functional group. Thus, in order to overcome this limitation, the surface of the artificial graphite is doped with the nitrogen element having two unshared electron pairs through step 2, and thus, artificial graphite having a hydrophilic surface as well as excellent electrochemical properties may be prepared.

Step 2 may be performed in a gas atmosphere in which hydrogen gas and one gas selected from the group consisting of hydrazine ($N_2H_2$), ammonia ($NH_3$), and a mixture thereof are mixed. Specifically, in step 2, the oxygen-containing functional group itself connected to the surface of the artificial graphite or the portion of the oxygen-containing functional group may be substituted with the nitrogen element by reducing the artificial graphite in a nitrogen gas atmosphere in which hydrazine or ammonia gas and hydrogen gas are mixed in a ratio of 3:7.

In this case, step 2 may be performed under a temperature condition of 800° C. to 1,000° C. Specifically, in the method of the present invention, step 2 is performed under conditions in which the temperature is increased to 800° C. to 1,000° C. over about 5 hours, the reaction is then preformed for about 2 hours, and subsequently, the temperature is reduced for 12 hours.

The nitrogen doping amount may be adjusted by the above-described temperature range, heating time, and reaction time as well as the limited gas composition.

In a case in which the above-described temperature range, heating time, and reaction time are less than the above-described ranges, for example, in a case in which the reaction is performed at a temperature of less than 800° C. or for less than 2 hours, the unreacted remaining oxygen-containing functional group may remain. Also, in a case in which the reaction is performed at a temperature of greater than 1,000° C. or for greater than 2 hours, since the amount of the reacted nitrogen is increased, the side reactivity with the electrolyte solution may be increased to reduce the initial efficiency, capacity, and lifetime characteristics of the battery, and, in addition, a nitrogen-doped portion may be damaged.

Also, in another embodiment of the present invention, provided is a negative electrode in which a negative electrode collector is coated with a negative electrode active material slurry including the negative electrode active material.

Specifically, the negative electrode may be prepared by coating the negative electrode collector with the negative electrode active material slurry including the negative electrode active material of the present invention and then drying and rolling the coated negative electrode collector.

The negative electrode collector is not particularly limited as long as it has conductivity without causing adverse chemical changes in the battery, and, for example, copper, stainless steel, aluminum, nickel, titanium, baked carbon, or aluminum or stainless steel that is surface-treated with one of carbon, nickel, titanium, silver, or the like may be used.

The negative electrode active material slurry may further include a binder as a component that assists in the binding between the active material and the conductive agent and in the binding with the current collector. The binder is not particularly limited, and, for example, one selected from the group consisting of polyvinylidene fluoride, polyvinyl alcohol, carboxymethylcellulose (CMC), starch, hydroxypropylcellulose, regenerated cellulose, polyvinylpyrrolidone, tetrafluoroethylene, polyethylene, polypropylene, an ethylene-propylene-diene monomer (EPDM), a sulfonated EPDM, a styrene-butadiene rubber (SBR), a fluoro rubber, and a mixture thereof may be used.

In some cases, the negative electrode active material slurry may further include a conductive agent. The conductive agent is not particularly limited as long as it has conductivity without causing adverse chemical changes in the battery, and, conductive materials, for example, graphite; a carbon-based material such as carbon black, acetylene black, Ketjen black, channel black, furnace black, lamp black, and thermal black; conductive fibers such as carbon fibers or metal fibers; metal powder such as carbon fluoride, aluminum, and nickel powders; conductive whiskers such as zinc oxide whiskers and potassium titanate whiskers; conductive metal oxides such as titanium oxide; or conductive materials such as polyphenylene derivatives, may be used.

Since the negative electrode active material according to the present invention has hydrophilicity by being doped with nitrogen, the negative electrode active material may have higher dispersibility in an aqueous system which prepares an electrode by using an aqueous solvent such as water and alcohol. Also, since the adhesive strength of the electrode may be improved due to an increase in affinity between the active material and the aqueous binder, a secondary battery having excellent electrical conductivity as well as stability even after long-term use may be provided. Furthermore, since the artificial graphite is modified to be hydrophilic by using nitrogen, the artificial graphite is electrochemically stable. In addition, since the capacity of the artificial graphite may be maintained by maintaining the interplanar spacing of the artificial graphite by the mild oxidation process, a secondary battery including the artificial graphite may exhibit excellent battery characteristics.

Also, in another embodiment of the present invention, provided is a secondary battery including the negative electrode, a positive electrode, a separator disposed between the positive electrode and the negative electrode, and a non-aqueous electrolyte solution.

The positive electrode may be prepared by coating a positive electrode collector with a positive electrode active material slurry including a positive electrode active material and then drying and rolling the coated positive electrode collector.

Although the positive electrode active material is not particularly limited, a lithium transition metal oxide may be particularly used. Examples of the lithium transition metal oxide may be Li.Co-based composite oxides such as $LiCoO_2$, Li.Ni.Co.Mn-based composite oxides such as $LiNi_xCo_yMn_zO_2$, Li.Ni-based composite oxides such as $LiNiO_2$, and Li.Mn-based composite oxides such as $LiMn_2O_4$, and these oxides may be used alone or in a mixture thereof.

The positive electrode collector is not particularly limited as long as it has high conductivity without causing adverse chemical changes in the battery, and, for example, stainless steel, aluminum, nickel, titanium, baked carbon, or aluminum or stainless steel that is surface-treated with one of carbon, nickel, titanium, silver, or the like may be used.

The positive electrode active material slurry may further include a binder. The binder is not particularly limited, and, for example, one selected from the group consisting of polyvinylidene fluoride, polyvinyl alcohol, carboxymethylcellulose (CMC), starch, hydroxypropylcellulose, regenerated cellulose, polyvinylpyrrolidone, tetrafluoroethylene, polyethylene, polypropylene, an ethylene-propylene-diene monomer (EPDM), a sulfonated EPDM, a styrene-butadiene rubber (SBR), a fluoro rubber, and a mixture thereof may be used.

In some cases, the positive electrode active material slurry may further include the same or different conductive agent from that used in the negative electrode active material slurry.

In the secondary battery of the present invention, the non-aqueous electrolyte solution may be formed of an electrolyte solution and a metal salt, and a non-aqueous organic solvent is used as the electrolyte solution.

Examples of the non-aqueous organic solvent may be aprotic organic solvents, such as N-methyl-2-pyrrolidone, propylene carbonate, ethylene carbonate, butylene carbonate, dimethyl carbonate, diethyl carbonate, γ-butyrolactone, 1,2-dimethoxy ethane, tetrahydroxy franc, 2-methyl tetrahydrofuran, dimethyl sulfoxide, 1,3-dioxolane, formamide, dimethylformamide, dioxolane, acetonitrile, nitromethane, methyl formate, methyl acetate, phosphate triester, trimethoxy methane, a dioxolane derivative, sulfolane, methyl sulfolane, 1,3-dimethyl-2-imidazolidinone, a propylene carbonate derivative, a tetrahydrofuran derivative, ether, methyl propionate, and ethyl propionate.

A lithium salt may be used as the metal salt, and the lithium salt is a material that is readily soluble in the non-aqueous electrolyte solution, wherein, for example, LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $(CF_3SO_2)_2NLi$, chloroborane lithium, lower aliphatic carboxylic acid lithium, lithium tetraphenyl borate, and imide may be used.

According to another embodiment of the present invention, a battery module including the secondary battery as a unit cell and a battery pack including the battery module are provided. Since the battery module or the battery pack includes the secondary battery having excellent battery characteristics as well as stability, the battery module or the battery pack may be used as a power source of any one of medium and large sized devices, for example, a power tool; electric cars including an electric vehicle (EV), a hybrid electric vehicle (HEV), and a plug-in hybrid electric vehicle (PHEV); or a power storage system.

Hereinafter, exemplary embodiments of the present invention will be described in detail to fully explain the present invention in such a manner that it may easily be carried out by a person with ordinary skill in the art to which the present invention pertains. However, the present invention may be modified in various forms and is not limited to the disclosed embodiments.

EXAMPLES

Example 1: Preparation of Negative Electrode Including Nitrogen-Doped Artificial Graphite Step 1: An oxygen-containing functional group was attached to flaky artificial graphite (product name: S360 by BTR) having a diameter of 5 μm to 20 μm by a mild oxidation process in which the artificial graphite was heat-treated in a tube furnace at 550° C. in an air atmosphere.

Step 2: A surface of the artificial graphite was doped with nitrogen by a process in which the artificial graphite having the oxygen-containing functional group attached thereto was reduced at 800° C. for 24 hours in a nitrogen gas atmosphere in which hydrazine ($N_2H_2$) gas and hydrogen gas were mixed in a ratio of 3:7.

Step 3: A negative electrode active material slurry was prepared by mixing 96 g of the nitrogen-doped artificial graphite, 1 g of CMC as an aqueous binder, 2 g of SBR, 1 g of acetylene black as a conductive agent, and 220 g of water as a solvent. A copper current collector was coated with the negative electrode active material slurry, and the coated collector was dried in a vacuum oven at 130° C. and rolled to prepare a negative electrode.

Comparative Example 1: Artificial Graphite

Step 1: A negative electrode active material slurry was prepared by mixing 96 g of typical unsurface-treated artificial graphite, 1 g of CMC as an aqueous binder, 2 g of SBR, 1 g of acetylene black as a conductive agent, and 220 g of water as a solvent. A copper current collector was coated with the negative electrode active material slurry, and the coated collector was dried in a vacuum oven at 130° C. and rolled to prepare a negative electrode.

Experimental Examples

Experimental Example 1

The nitrogen-doped artificial graphite prepared in step 2 of Example 1 was observed with a scanning electron microscope (SEM), and the results thereof are then illustrated in FIG. 1.

As illustrated in FIG. 1, it may be confirmed that the artificial graphite was in the form of a flake having a diameter of 5 μm to 20 μm, and it may be understood that the artificial graphite was stably maintained without the destruction of the form.

Thus, it may be understood that the artificial graphite may act as a stable negative electrode active material even after the mild oxidation process and the nitrogen doping process.

Experimental Example 2

An oxygen content of the outermost surface of the artificial graphite subjected to the mild oxidation process in step 1 of Example 1 was measured by an elemental analyzer, and the results thereof are presented in Table 1.

TABLE 1

|  | Oxygen content |
| --- | --- |
| Artificial graphite subjected to mild oxidation process of step 1 of Example 1 | 9 to 10 wt % |

Referring to Table 1, it may be understood that the oxygen-containing functional group was connected to the outermost surface of the artificial graphite at a substitution ratio of 9 wt % to 10 wt %.

Experimental Example 3

Figure 2:
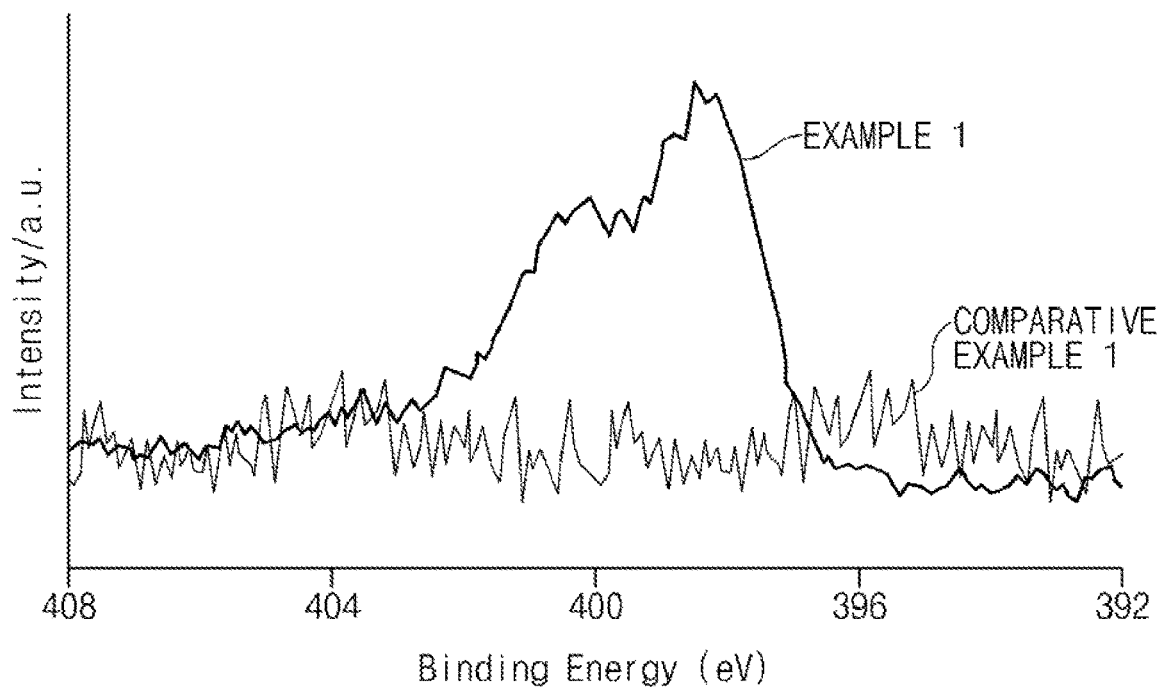
FIG. 2 is a graph illustrating the results of measuring binding energies of artificial graphite doped with nitrogen prepared in Example 1 and unsurface-treated artificial graphite of Comparative Example 1 according to Experimental Example 4 of the present invention.

Binding energies of the nitrogen-doped artificial graphite of step 2 of Example 1 and the unsurface-treated artificial graphite of Comparative Example 1 were measured by X-ray Photoelectron Spectroscopy (XPS), and the results thereof are presented in FIG. 2.

Referring to FIG. 2, the artificial graphite of Comparative Example 1 exhibited an overall uniform intensity distribution over an energy range of 392 eV to 408 eV. In contrast, with respect to the nitrogen-doped artificial graphite of Example 1, it may be confirmed that the intensity of binding energy began to increase at 396 eV and was again reduced at 404 eV.

Thus, it may be confirmed that the oxygen-containing functional group was connected to a portion of the surface of the artificial graphite by the mild oxidation process and the surface of the artificial graphite was doped with a predetermined amount of nitrogen by substituting a portion or all of the oxygen-containing functional groups with the nitrogen.

Also, as a result of calculating a doping concentration of nitrogen using a ratio of a peak area of carbon between 280 eV to 292 eV and a peak area of nitrogen between 396 eV to 404 eV from the binding energy graph of FIG. 2, it may be understood that the surface of the artificial graphite was doped with about 7.21 atom % of nitrogen.

Experimental Example 4

Figure 3:
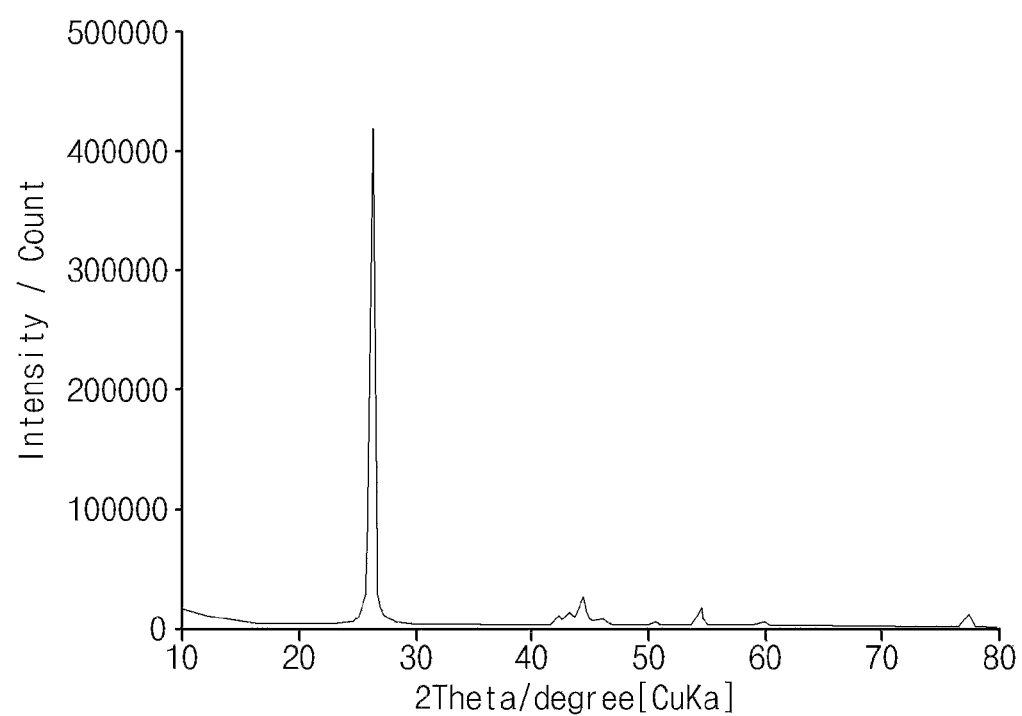
FIG. 3 is an X-ray diffraction (XRD) graph of artificial graphite subjected to a mild oxidation process of step 1 of Example 1 of the present invention which is measured by an X-ray diffractometer.
Figure 4:
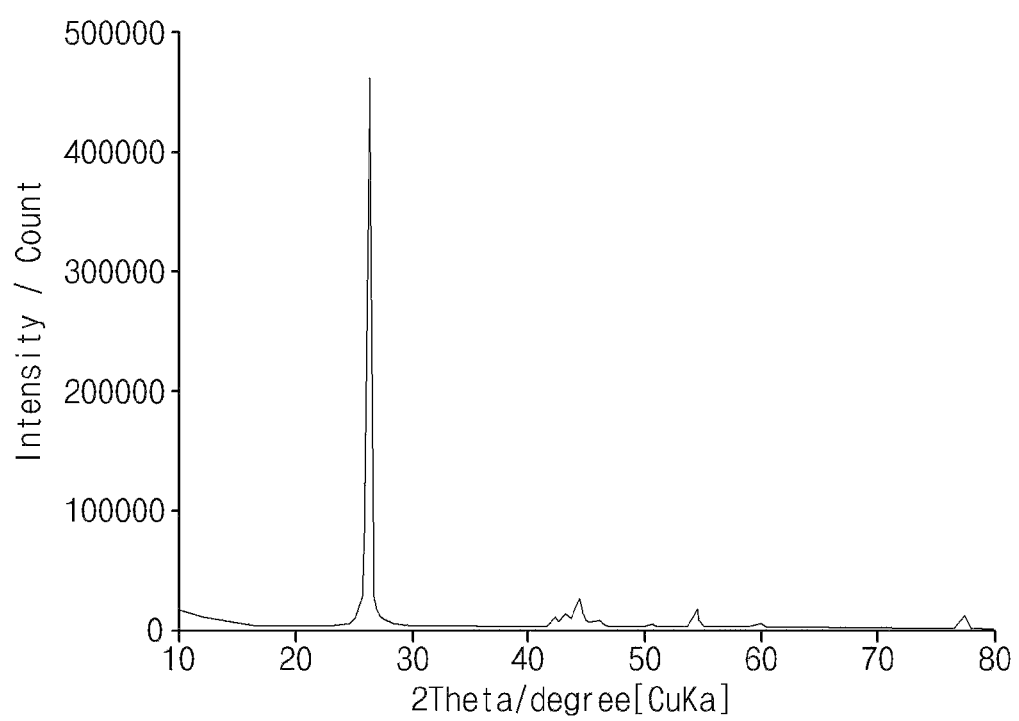
FIG. 4 is an XRD graph of the nitrogen-doped artificial graphite of step 2 of Example 1 of the present invention which is measured by an X-ray diffractometer.
Figure 5:
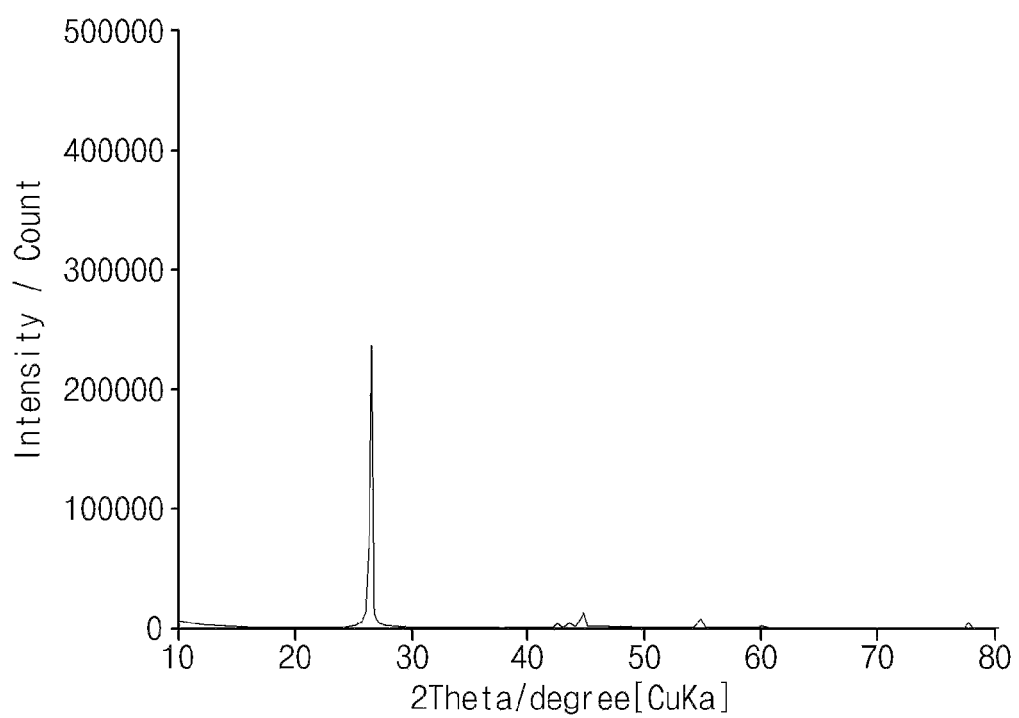
FIG. 5 is an XRD graph of the unsurface-treated artificial graphite of Comparative Example 1.

Interplanar spacings ($d_{002}$) of the unsurface-treated artificial graphite of Comparative Example 1, the artificial graphite subjected to the mild oxidation process of step 1 of Example 1, and the nitrogen-doped artificial graphite of step 2 were measured using an X-ray diffractometer, and the results thereof are presented in FIGS. 3 to 5 and the following Table 2.

TABLE 2

|  | Interplanar spacing ($d_{002}$) |
| --- | --- |
| Comparative Example 1 (unsurface-treated artificial graphite) | 0.3372 nm |
| Step 1 of Example 1 (artificial graphite subjected to mild oxidation process) | 0.3385 nm |
| Step 2 of Example 1 (artificial graphite subjected to nitrogen doping) | 0.3377 nm |

As illustrated in FIGS. 3 to 5 and Table 2, the interplanar spacing of the unsurface-treated artificial graphite of Comparative Example 1 was 0.3372 nm (see FIG. 5), the interplanar spacing of the artificial graphite subjected to the mild oxidation process of step 1 in Example 1 was 0.3385 nm (see FIG. 3), and the interplanar spacing of the artificial graphite further subjected to the nitrogen doping of step 2 was 0.3377 nm (see FIG. 4).

That is, it may be understood that, after the mild oxidation process, the interplanar spacing of the artificial graphite was increased by 0.38% in comparison to that before the mild oxidation process, and was reduced by 0.23% after the nitrogen doping. Thus, it may be understood that a difference in the interplanar spacing between the artificial graphite surface-treated according to the method of the present invention of FIG. 4 and the unsurface-treated artificial graphite of Comparative Example 1 of FIG. 5 was about 0.1%.

Therefore, it may be understood that a hydrophilic treatment may be performed by the mild oxidation process and the nitrogen doping without significant changes in the structure of the artificial graphite.

Experimental Example 5

In order to investigate dispersibility of the artificial graphites prepared in Example 1 and Comparative Example 1, the negative electrode active material slurry prepared in step 3 of Example 1 and the negative electrode active material slurry prepared in Comparative Example 1 were stored at room temperature for 7 days, a supernatant was extracted, a solvent was evaporated, a weight of the residue was then measured, and the results thereof are presented in Table 3.

TABLE 3

|  | Solid Mass (g) |
| --- | --- |
| Example 1 | 1.3 |
| Comparative Example 1 | 0.6 |

As illustrated in Table 3, with respect to the negative electrode active material slurry including the nitrogen-doped artificial graphite of Example 1, about 1.3 g of a solid was remained, but, with respect to the negative electrode active material slurry including the unsurface-treated artificial graphite of Comparative Example 1, about 0.6 g of a solid was remained. That is, it may be understood that a solid content of the negative electrode active material slurry of Example 1 was about twice that of the negative electrode active material slurry of Comparative Example 1.

Since the unsurface-treated artificial graphite of Comparative Example 1 had poor dispersibility, the artificial graphite was not uniformly dispersed in the solvent and was sedimented into an infranatant, and thus, the weight of the solid remaining after the supernatant was evaporated was small. In contrast, since hydrophilicity of the nitrogen-doped artificial graphite of Example 1 was improved to have high dispersibility in the aqueous system, the nitrogen-doped artificial graphite may be uniformly dispersed in both the supernatant and the infranatant in the solvent, and thus, it may be predicted that a large amount of the solid was remained after the supernatant was evaporated.

Experimental Example 6

Adhesive strengths of the negative electrodes prepared in Example 1 and Comparative Example 1 were measured. In this case, adhesion measurement was performed using a 180-degree peel test. The results thereof are presented in Table 4 below.

TABLE 4

| | Adhesion (gf/15 mm) |
|---|---|
| Example 1 | 30 |
| Comparative Example 1 | 13 |

As illustrated in Table 4, the adhesion of the negative electrode of Example 1 of the present invention was 30 gf/15 mm, wherein it may be understood that the negative electrode of Example 1 had excellent adhesion which was 2.3 times than that of negative electrode 13 gf/15 mm of Comparative Example 1 in which the unsurface-treated artificial graphite was used.

Thus, since the dispersibility of the negative electrode active material including the nitrogen-doped artificial graphite of the present invention was excellent, and thus, the adhesive strength of the electrode including the negative electrode active material of the present invention was excellent, and furthermore, it may be predicted that a secondary battery having high electrical conductivity as well as stability even after long-term use may be provided.

The invention claimed is:

1. A negative electrode active material comprising artificial graphite surface-modified with nitrogen atoms,
    wherein the artificial graphite is bonded with 5 wt % to 10 wt % of an oxygen-containing functional group having a portion substituted with the nitrogen atoms;
    5 wt % to 15 wt % of an oxygen-containing functional group; and
    80 wt % to 90 wt % of a hydrogen atom, based on a total weight of covalent bondable sites of outermost carbon atoms of the artificial graphite, and
    wherein the artificial graphite is selected from the group consisting of graphitized mesocarbon microbeads, graphitized mesophase pitch-based carbon fibers, and graphitized cokes, and
    wherein the artificial graphite has a diameter of 5 µm to 20 µm.

2. The negative electrode active material of claim 1, wherein the oxygen-containing functional group is at least one selected from the group consisting of a hydroxyl group, an epoxy group, a carboxyl group, and a lactol group.

3. The negative electrode active material of claim 1, wherein an interplanar spacing ($d_{002}$) of a carbon hexagonal plane of the negative electrode active material is in a range of 0.3350 nm to 0.3400 nm.

4. A method of preparing the negative electrode active material of claim 1, the method comprising steps of:
    connecting the oxygen-containing functional group to the artificial graphite by a mild oxidation process (step 1); and
    doping with the nitrogen atoms by reducing the oxygen-containing functional group connected the artificial graphite of step 1 in a nitrogen atmosphere (step 2).

5. The method of claim 4, wherein the mild oxidation process of step 1 is performed by heat treating the artificial graphite at a temperature of 500° C. to 600° C. in an air atmosphere.

6. The method of claim 5, wherein the mild oxidation process is performed for 1 hour to 1.5 hours.

7. The method of claim 4, wherein the mild oxidation process of step 1 is performed by immersing the artificial graphite in an acid solution for 4 hours to 6 hours and drying the artificial graphite.

8. The method of claim 7, wherein a nitric acid solution having a concentration of 30 wt % to 50 wt % and a temperature of 50° C. to 70° C. is used as the acid solution.

9. The method of claim 7, wherein the drying is performed in a vacuum state at a temperature of 250° C. to 300° C.

10. The method of claim 4, wherein the oxygen-containing functional group of step 1 is bonded to the covalent bondable sites of outermost carbon atoms of the artificial graphite at a substitution ratio of 10 wt % to 20 wt %.

11. The method of claim 4, wherein the doping with the nitrogen atoms of step 2 is performed in e the nitrogen gas atmosphere in which hydrogen gas and one gas selected from the group consisting of hydrazine (N2H2), ammonia (NH3), and a mixture thereof are mixed.

12. The method of claim 11, wherein the doping with the nitrogen atoms of step 2 is performed in the nitrogen gas atmosphere in which the hydrazine ($N_2H_2$) or the ammonia gas ($NH_3$) and the hydrogen gas are mixed in a ratio of 3:7.

13. The method of claim 11, wherein the doping with the nitrogen atoms of step 2 is performed in a temperature of 800° C. to 1,000° C.

14. A negative electrode for a secondary battery in which a negative electrode collector is coated with a negative electrode active material slurry including the negative electrode active material of claim 1.

15. The negative electrode for a secondary battery of claim 14, wherein the negative electrode active material slurry further is a binder.

16. The negative electrode for a secondary battery of claim 15, wherein the binder is at least one selected from the group consisting of polyvinylidene fluoride, polyvinyl alcohol, carboxymethylcellulose, starch, hydroxypropylcellulose, regenerated cellulose, polyvinylpyrrolidone, tetrafluoroethylene, polyethylene, polypropylene, an ethylene-propylene-diene monomer (EPDM), a sulfonated EPDM, a styrene-butadiene rubber (SBR), and a fluoro rubber.

17. A secondary battery comprising:
    a negative electrode;
    a positive electrode;
    a separator disposed between the negative electrode and the positive electrode; and
    a non-aqueous electrolyte solution,
    wherein the negative electrode is the negative electrode for a secondary battery of claim 14.

* * * * *